R. N. CARTER.
HEADLIGHT FOR VEHICLES.
APPLICATION FILED SEPT. 15, 1914.
1,130,067.
Patented Mar. 2, 1915.
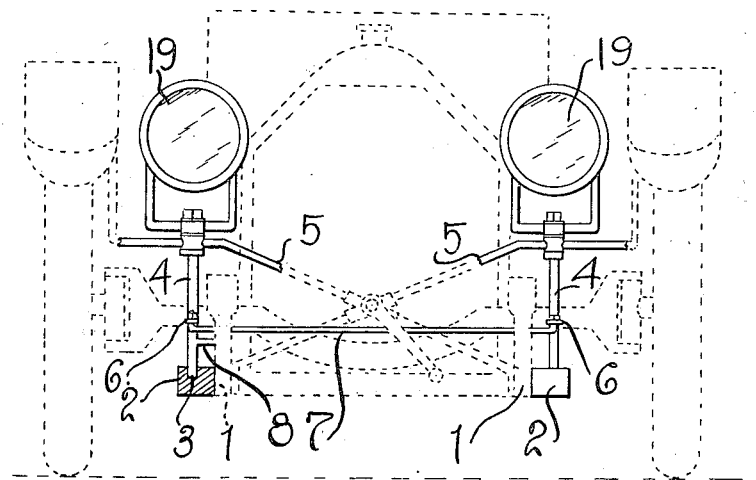
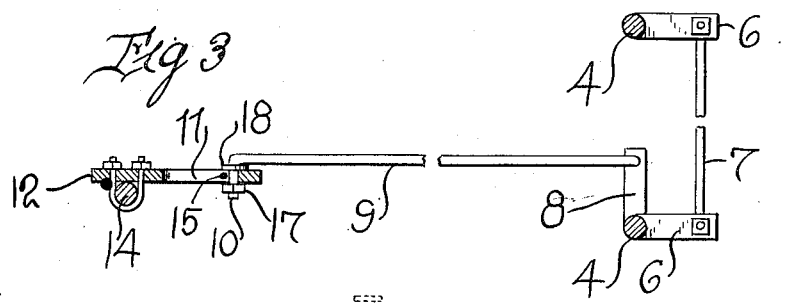
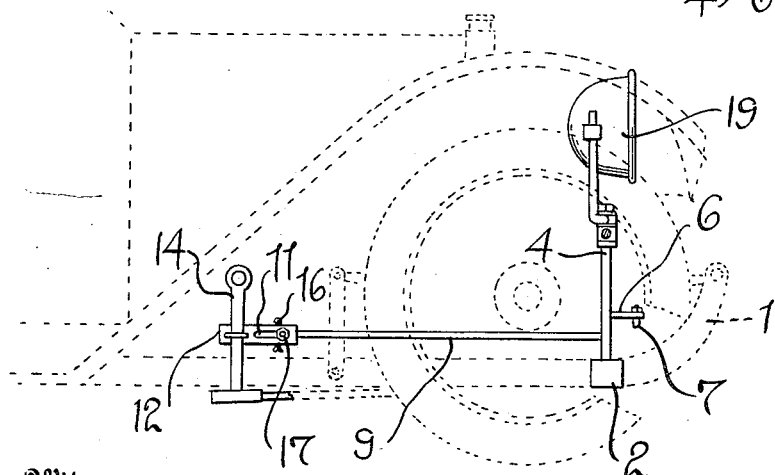
Witnesses
Inventor
R. N. CARTER
By Watson E. Coleman
Attorney

UNITED STATES PATENT OFFICE.

RALPH N. CARTER, OF BUCKLIN, MISSOURI.

HEADLIGHT FOR VEHICLES.

1,130,067. Specification of Letters Patent. Patented Mar. 2, 1915.

Application filed September 15, 1914. Serial No. 861,847.

*To all whom it may concern:*

Be it known that I, RALPH N. CARTER, a citizen of the United States, residing at Bucklin, in the county of Linn and State of Missouri, have invented certain new and useful Improvements in Headlights for Vehicles, of which the following is a specification, reference being had to the accompanying drawings.

This invention relates to certain improvements in head-lights, and has relation more particularly to a device of this general character especially designed and adapted for use in connection with motor driven vehicles, and an object of the invention is to provide a device of this general character having novel and improved means whereby the head-light will be caused to move in unison with and in the same general direction as the steering wheels of the vehicle.

Furthermore, it is an object of this invention to provide a device of this general character which is controlled from the steering mechanism and which may be readily adjusted into operative and inoperative engagement with the steering mechanism.

The invention consists in the details of construction and in the combination and arrangement of the several parts of my improved head-light whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a fragmentary view, partly in section and partly in elevation, of the operating means for a head-light constructed in accordance with an embodiment of my invention, the coacting vehicle being indicated by dotted lines; Fig. 2 is a side elevational view of the device disclosed in Fig. 1; and Fig. 3 is an enlarged fragmentary view, partly in elevation and partly in section, illustrating certain details of my invention as herein disclosed.

As disclosed in the accompanying drawings, 1 denotes the forward portion of a conventional frame for an automobile or the like, having projecting laterally from the outer side faces thereof the blocks 2 provided in their upper faces with suitable sockets 3 in which are adapted to be mounted the lower extremities of the vertically disposed posts 4 capable of axial rotation, the upper extremities of such posts being rotatably supported, as herein disclosed, by the brace rods 5 for the cranking shaft, said brace rods being of a well known arrangement.

The posts 4 are provided with the arms 6 extending in the same general direction and tied or connected by the pitman or rod 7, whereby it will be readily perceived that both of the posts 4 will be caused to move in unison and in the same direction. One of the posts 4 is provided with a second arm 8 disposed inwardly relatively to the frame 1 and substantially perpendicular to the arm 6 and has pivotally engaged therewith an extremity of a rod 9, the opposite extremity thereof being angularly disposed, as indicated at 10, and directed through the elongated slot 11 disposed longitudinally of the bracket 12 clamped to the steering shaft or link 14 of the steering mechanism proper, which may be of any conventional form.

The forward end portion of the slot 11 is intersected by an opining 15 produced in the bracket 12 through which a removable pin 16 is adapted to be directed in order to coact with the angular extremity 10 of the rod 9 to assure the requisite reciprocation thereof during the steering operation of the vehicle so as to cause the posts 4 to properly rotate.

When it should be desired to free the posts of movement under the influence of the rod 9, it will be readily understood that it is only necessary to remove the pin 16 as the slot 11 is of such a length as to readily permit the movement of the bracket 12 with the shaft 14 without influencing the rod 9.

In order to maintain the rod 9 against displacement from the bracket 12 I find it of advantage to apply to the angular portion 10 the nut or bur 17 which underlies the bracket and to provide such angular portion 10 with a washer 18 which overlies the bracket, as is believed to be clearly shown in the accompanying drawings.

As is believed to be self-evident, the upper extremities of the posts 4 are adapted to have secured thereto in any desired manner the lamps or head-lights 19 which are adapted to be moved by the posts 4.

From the foregoing description it is thought to be obvious that a head-light for vehicles constructed in accordance with my invention is of an extremely simple and comparatively inexpensive nature, and is particularly well adapted for use by reason of the convenience and facility with which it may be assembled and by reason of the effectiveness with which it performs its functions, and it will also be obvious that my invention is susceptible of some change and modification without material departure from the principles and spirit thereof and for this reason I do not wish to be understood as limiting myself to the precise structure and formation of the several parts herein shown of my invention in practice.

I claim:

In combination with a vehicle provided with a steering mechanism of a rotatably supported post for a lamp, a bracket carried by a movable part of the steering mechanism, said bracket being provided with an elongated slot, an arm projecting from the post, a rod in pivotal engagement with the arm and having an angular extremity disposed through the slot of the bracket, means carried by the angular extremity of the rod disposed at opposite sides of the bracket for maintaining the angular extremity against displacement from within the slot of the bracket, and removable means coacting with the bracket for holding the rod against movement independently of the bracket.

In testimony whereof I hereunto affix my signature in the presence of two witnesses.

RALPH N. CARTER.

Witnesses:
WARD C. CAMPBELL,
C. A. LARSON.